Nov. 5, 1946.  J. D. BUCHANAN  2,410,404
VALVE
Filed Nov. 15, 1943
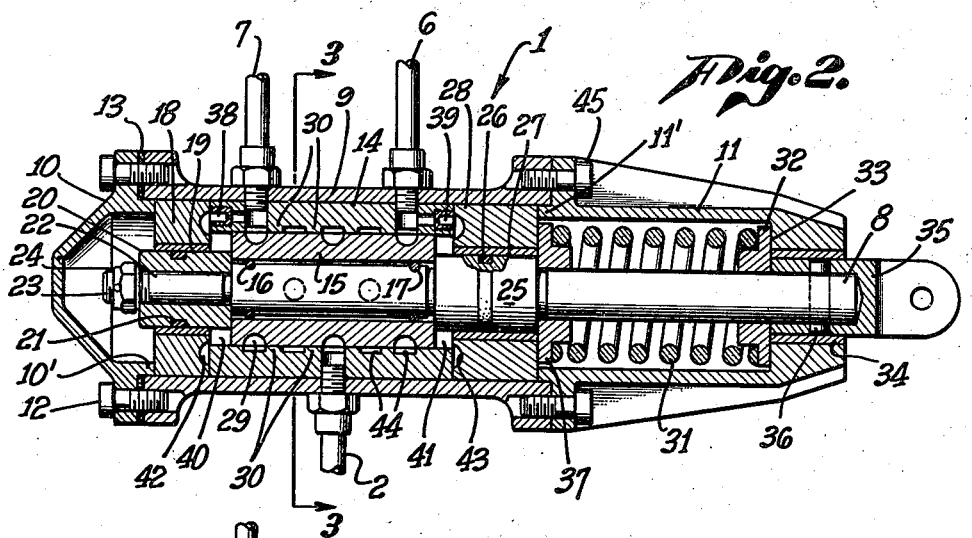
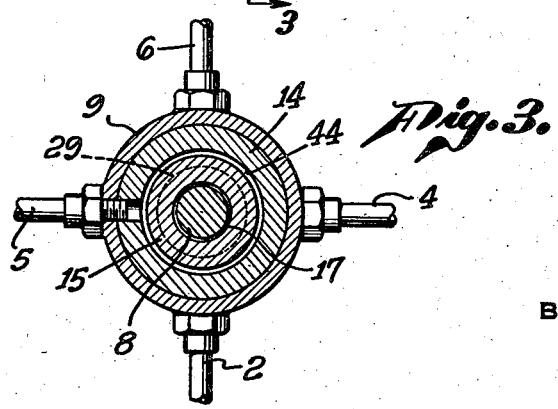
J. D. BUCHANAN,
INVENTOR.
BY W. E. Beatty
ATTORNEY.

Patented Nov. 5, 1946

2,410,404

UNITED STATES PATENT OFFICE 2,410,404

VALVE

J. D. Buchanan, Burbank, Calif.

Application November 15, 1943, Serial No. 510,389

4 Claims. (Cl. 251—76)

1

The invention relates to a valve and particularly to a valve for controlling high pressure such as 1,000 pounds per square inch and more, as employed in modern hydraulics, and wherein the valve head must fit on its seat with a very close tolerance to prevent leakage at such pressures.

It has heretofore been proposed to employ a valve head which is integral with a valve stem, and this necessitates that the bore in which the valve stem slides with respect to the valve seat must be coaxial therewith to the same close tolerance as that required between the valve head and its seat. This increases the cost of making such valves and in working to these close tolerances for all the working parts, as stated.

An object of the present invention is to reduce the cost and simplify the manufacture of such valves while maintaining the desired close tolerance between the valve head and its seat, while permitting slight eccentricity between the valve seat and the valve stem bearing.

This is accomplished by not making the valve head integral with the valve stem, but instead by supporting it on the stem with provision for lateral displacement of the valve head with respect to the valve stem. In this way the valve stem and valve head need not be exactly coaxial, while nevertheless an accurate fit between the valve head and its seat is possible.

For further details of the invention, reference may be made to the drawing wherein:

Fig. 1 is a schematic showing of a well known valve system employing the improved valve of this invention.

Fig. 2 is a longitudinal sectional view of the valve of this invention.

Fig. 3 is a sectional view on line 3—3 of Fig. 2, looking in the direction of the arrows.

Referring in detail to the drawing, the valve of this invention, generally indicated at 1, may be employed to control a high pressure fluid having a pressure of 1,000 pounds per square inch or more in the supply pipe 2, to move the piston 3 in one direction or another, as is well known. For this purpose, the valve 1, as usual, is also provided with two outlet lines 4 and 5 communicating with opposite sides of the piston 3 and with two return lines 6 and 7. The piston 3 may be connected to any suitable load to be reciprocated in response to the sliding movement of the valve stem 8.

As shown in Figs. 2 and 3, a valve 1 has a casing comprising a cylindrical shell 9 having end caps 10 and 11, all of which may be made of aluminum. Cap 10 is secured to the left end of the shell 9 by suitable means such as screws 12. The cap 10 is imperforate and a sealing ring 13 is arranged between cap 10 and the left end of shell 9 to prevent leakage. Fitting in the shell 9 is a hollow cylindrical valve seat 14 having a cooperating cylindrical valve head 15 mounted on resilient ring seals 16 and 17 on the valve stem 8. Fitting in the shell 9 against the left end of the valve seat 14 is a bearing block 18 having a cylindrical bore 19 in which the piston 20 slidingly fits. The piston 20 has a ring seal 21 and it is loosely mounted on a reduced portion of the valve stem 8 indicated at 22. The left end of the valve stem portion 22 is threaded as indicated at 23 to receive a nut 24 which clamps the piston 21 against the valve head 15, urging the latter against a piston 25 which is fixed on the valve stem 8. Piston 25 has a sealing ring 26 and it slidingly fits in a bore 27 the same size as the bore 19, and arranged in the bearing block 28 at the right end of the valve seat 14.

The nut 24 is suitably locked in place with enough clearance between the valve head 15 and the pistons 20 and 25 to permit valve head 15 to displace laterally with respect to valve stem 8. This clearance may be of the order of one thousandth of an inch, a clearance too large for the fit between the valve head 15 and its seat 14.

One or both of the seat 14 and the valve head 15 is or are hardened, steel, ground and lapped surfaces, chromium plated and fitting together with a very close tolerance such as .0001 or .0002 inch.

Pistons 20 and 25 are preferably of steel, and their cooperating slide bearings in the blocks 18 and 28 are preferably of bronze.

Valve head 15 is provided with three annular grooves such as 29, each having a width greater than the four ribs such as 30 in the valve seat 14, whereby the valve head 15, by means of the valve stem 8, may be moved to the left, or to the right, from the neutral position shown, to control the reciprocation of piston 3 in an obvious manner.

Valve head 15 is maintained normally in the neutral position shown, wherein the pressure in inlet pipe 2 is not communicated to either outlet 4 or 5, by means of a compression spring 31 which bears at its right end against a washer 32 which fits around stem 8 and bears against a shoulder 33 on the inside of cap 11. Cap 11 at its outer end has a suitable bearing 34 for a valve stem extension 35 secured to the valve stem 8 by a lock pin 36. The other end of spring 31 bears against a washer 37 which rides on the stem 8 and bears against the right end of the bearing block 28.

Cap 10 has an annular extension 10' which fits in the shell 9, and cap 11 has a similar extension 11', which bears against the outer ends of blocks 18 and 28 respectively to compress them tightly against the ends of the valve seat 14. Cap 11 has screws 45.

The valve seat 14 has five spaced annular grooves or passageways 44, with one of the annular ribs or valve portions 30 between adjacent grooves 44. The two outer grooves 44 communicate with the return pipes 6 and 7 respectively. The central groove 44 communicates with the inlet 2, and the other two grooves 44 are connected to the outlets 4 and 5. In order to cushion the movement of valve 15, a restricted outlet 38 and 39 may be provided between each end of valve 15 and the adjacent return 7 and 6 respectively. With the valve 15 in neutral position as shown in Fig. 2, spaces 40 and 41 exist between the left and right ends of valve head 15 and the adjacent bearing blocks 18 and 28 respectively. When valve stem is moved to the right, space 40 increases in size until the left end of valve head 15 uncovers the groove 44 connected to return 7, whereupon fluid flows from return 7 into space 40. Space 40 communicates with restricted outlet 38 through an annular groove 42 in the bearing block 18, and a similar groove 43 is provided in the bearing block 28. When the valve head 15 is later moved to the left, its movement is cushioned, as the fluid in space 40 must pass through the restricted outlet 38. When valve head 15 is moved to the left, the right end of valve head 15 uncovers the groove 44 connected to return 6 to admit fluid to space 41. Restricted outlet 39 cushions the movement of valve head 15 to the right. Hence valve 15 is cushioned in both directions.

It will be apparent that the cost of constructing the valve has been reduced through eliminating the necessity for machining the interior of valve seat 14 to be exactly coaxial with the valve stem bearings in the blocks 18 and 28, by reason of the fact that the valve head 15 in effect floats on the ring seal 16 and 17, and hence the valve head 15 may very accurately fit its seat 14 even though there is substantial eccentricity between the valve stem 8 (or the valve stem bearings in blocks 18 and 28) and the bore of valve seat 14.

It will be apparent that the valve may be used for either high or low pressures, and that various modifications may be made in the invention without departing from the spirit of the following claims. For example, instead of using two sealing rings 16 and 17, only one central sealing ring may be used.

I claim:

1. A valve comprising the combination of a valve stem, a bearing therefor, a hollow cylindrical valve seat, said bearing and said seat being relatively eccentric, a cylindrical valve head fitting said seat with close tolerance, abutment means on said valve stem for imparting valve opening and closing movement to said valve head with a tolerance permitting lateral displacement of said valve head on said valve stem, and resilient sealing means supporting said valve head for lateral displacement on said valve stem, whereby said valve head fits said valve seat with a closer tolerance than the tolerance of the eccentricity between said valve seat and said valve stem bearing.

2. A valve comprising the combination of a hollow cylindrical valve seat having inlet, outlet and return ports, a cylindrical valve head slidably fitting in said seat with a close tolerance, a valve stem in said valve head, a piston head on said valve stem at each end of said valve head, means for retaining said valve head between said piston heads with a tolerance permitting lateral movement of said valve head on said valve stem, spaced resilient ring seals on said valve stem supporting said valve head for lateral displacement, and a bearing at each end of said valve head, each of said bearings having a bore in which one of said piston heads slidingly fits.

3. A valve comprising the combination of a hollow cylindrical valve seat having inlet, outlet and return ports, a cylindrical valve head slidably fitting in said seat with a close tolerance, a valve stem in said valve head, resilient sealing means supporting said valve head on said valve stem, a fixed piston on said valve stem at one end of said valve head, a second piston slidably fitting on said valve stem at the other end of said valve head, means for retaining said second piston in position with said valve head between said pistons with a tolerance permitting lateral displacement of said valve head with respect to said valve stem, and spaced bearings each having a bore in which one of said pistons slidably fits, whereby the coaxiality of said bores with respect to said valve seat may have a greater tolerance than the tolerance with which said valve head fits said valve seat.

4. A valve comprising the combination of a hollow cylindrical valve seat, a cylindrical valve head slidably fitting in said seat with a close tolerance, said valve head having a cylindrical bore, a valve stem extending through said bore and smaller in size than said bore, resilient sealing means in the bore of said valve head and arranged between said valve head and said valve stem, said sealing means supporting said valve head for floating movement on said valve stem, a bearing at each end of said valve head supporting said valve stem for sliding movement, spaced abutment means on said valve stem at the opposite ends of said valve head for retaining said valve head in position on said valve stem with a tolerance permitting said valve head to fit said seat with a close tolerance even though the axis of said valve seat is offset and substantially parallel to the axis of said valve stem and even though the axis of said valve seat intersects the axis of said valve stem at a point beyond said valve head, whereby the coaxiality of said valve stem bearings with respect to said valve seat may have a greater tolerance than the tolerance with which said valve head fits said valve seat.

J. D. BUCHANAN.